United States Patent
Kray et al.

(10) Patent No.: US 10,247,014 B2
(45) Date of Patent: Apr. 2, 2019

(54) COMPOSITE COMPRESSOR BLADE AND METHOD OF ASSEMBLING

(71) Applicant: General Electric Company, Schenectady, NY (US)

(72) Inventors: Joseph Nicholas Kray, Mason, OH (US); Gregory Carl Gemeinhardt, Park Hills, NY (US); Prakash Kashiram Jadhav, Bangalore (IN); Douglas Edward Klei, Cincinnati, OH (US); Phani Nandula, Bhimavaram (IN); Suresh Subramanian, Bangalore (IN)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 14/893,217

(22) PCT Filed: May 21, 2014

(86) PCT No.: PCT/US2014/038904
§ 371 (c)(1),
(2) Date: Nov. 23, 2015

(87) PCT Pub. No.: WO2014/190008
PCT Pub. Date: Nov. 27, 2014

(65) Prior Publication Data
US 2016/0130955 A1  May 12, 2016

Related U.S. Application Data

(60) Provisional application No. 61/826,664, filed on May 23, 2013.

(51) Int. Cl.
*F01D 5/30* (2006.01)
*F01D 5/28* (2006.01)
*F01D 11/00* (2006.01)

(52) U.S. Cl.
CPC .......... *F01D 5/282* (2013.01); *F01D 5/3038* (2013.01); *F01D 11/008* (2013.01);
(Continued)

(58) Field of Classification Search
CPC ...... F01D 5/282; F01D 5/3038; F01D 11/008; F05D 2220/3216; F05D 2300/603
(Continued)

(56) References Cited

U.S. PATENT DOCUMENTS 1,476,626 A * 12/1923 Losel ............... F01D 5/3038
                                                    416/215
2,916,257 A * 12/1959 Poellmitz ............ F01D 5/22
                                                    416/215
(Continued)

FOREIGN PATENT DOCUMENTS

CN    101509398 A    8/2009
CN    102213108 A   10/2011
(Continued)

OTHER PUBLICATIONS

International Search Report and Written Opinion issued in connection with corresponding PCT application No. PCT/US2014/038904 dated Nov. 10, 2014.
(Continued)

*Primary Examiner* — Aaron R Eastman
(74) *Attorney, Agent, or Firm* — General Electric Company; Kristi Davidson

(57) ABSTRACT

Compressor blades constructed of composite materials are disclosed. Some example compressor blades may include a composite blade panel including an airfoil having a span extending radially outward with respect to an axis of rotation and/or a blade attachment feature radially inward from the airfoil with respect to the axis of rotation. The blade attachment feature may be circumferentially oriented with respect
(Continued)

to the axis of rotation. The blade attachment feature may be arranged to releasably engage a generally circumferentially oriented spool attachment feature. The spool attachment feature may be generally shaped as a circumferential dovetail slot configured to slidably receive the blade attachment feature therein.

17 Claims, 5 Drawing Sheets

(52) U.S. Cl.
CPC ............... *F05D 2220/3216* (2013.01); *F05D 2300/603* (2013.01); *Y02T 50/672* (2013.01)

(58) Field of Classification Search
USPC .......................................... 416/230, 215, 217
See application file for complete search history.

(56) References Cited

U.S. PATENT DOCUMENTS

| 3,309,058 | A | * | 3/1967 | Blackhurst | ............ | F01D 5/3007 |
| | | | | | | 415/200 |
| 3,532,438 | A | * | 10/1970 | Palfreyman | ............ | B29D 22/00 |
| | | | | | | 416/198 A |
| 7,491,032 | B1 | | 2/2009 | Powell et al. | | |
| 8,011,877 | B2 | | 6/2011 | Schilling et al. | | |
| 8,348,619 | B2 | | 1/2013 | Derclaye et al. | | |
| 8,727,730 | B2 | | 5/2014 | Liotta et al. | | |
| 2006/0222502 | A1 | * | 10/2006 | Hansen | ................. | F01D 5/3038 |
| | | | | | | 416/220 R |
| 2009/0180886 | A1 | * | 7/2009 | Derclaye | ............... | F01D 5/3038 |
| | | | | | | 416/215 |
| 2010/0111699 | A1 | * | 5/2010 | Morris | ................... | F01D 11/008 |
| | | | | | | 416/219 R |
| 2010/0166560 | A1 | * | 7/2010 | Blanchard | ............... | F01D 5/282 |
| | | | | | | 416/214 A |
| 2011/0027090 | A1 | * | 2/2011 | Casavant | ............... | F01D 5/3038 |
| | | | | | | 416/215 |
| 2012/0099995 | A1 | * | 4/2012 | Delvaux | ................... | F01D 5/30 |
| | | | | | | 416/203 |
| 2013/0186304 | A1 | * | 7/2013 | Pabla | ...................... | C23C 24/04 |
| | | | | | | 106/287.19 |
| 2015/0101351 | A1 | * | 4/2015 | Healy | ..................... | F01D 5/303 |
| | | | | | | 60/805 |

FOREIGN PATENT DOCUMENTS

| EP | 1013886 | A2 | 6/2000 |
| EP | 1855011 | A1 | 11/2007 |

OTHER PUBLICATIONS

Unofficial English Translation of Chinese Office Action issued in connection with corresponding CN Application No. 201480029674.2 dated Apr. 12, 2016.

* cited by examiner

COMPOSITE COMPRESSOR BLADE AND METHOD OF ASSEMBLING

CROSS-REFERENCE TO RELATED APPLICATIONS

This application is a national stage application under 35 U.S.C. § 371(c) of prior filed, co-pending PCT application serial number PCT/US2014/038904, filed on May 21, 2014, which claims priority to U.S. Patent Application Ser. No. 61/826,664, titled "Composite Compressor Blade" filed May 23, 2013. The above-listed applications are herein incorporated by reference.

BACKGROUND

The subject matter disclosed herein relates generally to gas turbine engines and, more particularly, to compressor blades constructed of composite materials.

Although some turbofan engines may include composite fan blades having axially oriented attachment features, such engines may include compressors (e.g., low pressure compressors, boosters, and/or high pressure compressors) having metal compressor blades with integral platforms.

Metal compressor blades with integral platforms may be expensive to produce and/or may have substantial weight, therefore, it may be beneficial to reduce weight and/or price of the blades.

SUMMARY OF THE INVENTION

At least one beneficial solution is provided by the present disclosure to include example embodiments, provided for illustrative teaching and not meant to be limiting.

Some example compressor blades according to at least some aspects of the present disclosure may include a composite blade panel including an airfoil having a span extending radially outward with respect to an axis of rotation and/or a blade attachment feature radially inward from the airfoil with respect to the axis of rotation. The blade attachment feature may be circumferentially oriented with respect to the axis of rotation.

Some example compressor rotors according to at least some aspects of the present disclosure may include a metallic rotor spool arranged to rotate about an axis of rotation and/or a plurality of composite blades releasably mounted to the rotor spool to extend radially outward from the rotor spool. The rotor spool may include a generally radially outward facing, circumferentially oriented spool attachment feature. An individual one of the blades may include an airfoil having a span extending radially outward with respect to the axis of rotation and a circumferentially oriented blade attachment feature radially inward from the airfoil with respect to the axis of rotation. The blade attachment feature may releasably engage the spool attachment feature.

Some example methods of assembling a compressor rotor according to at least some aspects of the present disclosure may include aligning a circumferentially oriented blade attachment feature of a first composite blade with a circumferentially oriented spool attachment feature of a metallic rotor spool; engaging the blade attachment feature of the first blade with the spool attachment feature by circumferentially translating the first blade with respect to the spool; aligning a circumferentially oriented blade attachment feature of a second composite blade with the spool attachment feature; and/or engaging the blade attachment feature of the second blade with the spool attachment feature by circumferentially translating the second blade with respect to the spool.

BRIEF DESCRIPTION OF THE DRAWINGS

The subject matter for which patent claim coverage is sought is particularly pointed out and claimed herein. The subject matter and embodiments thereof, however, may be best understood by reference to the following description taken in conjunction with the accompanying drawing figures in which:

DETAILED DESCRIPTION

Figure 1:
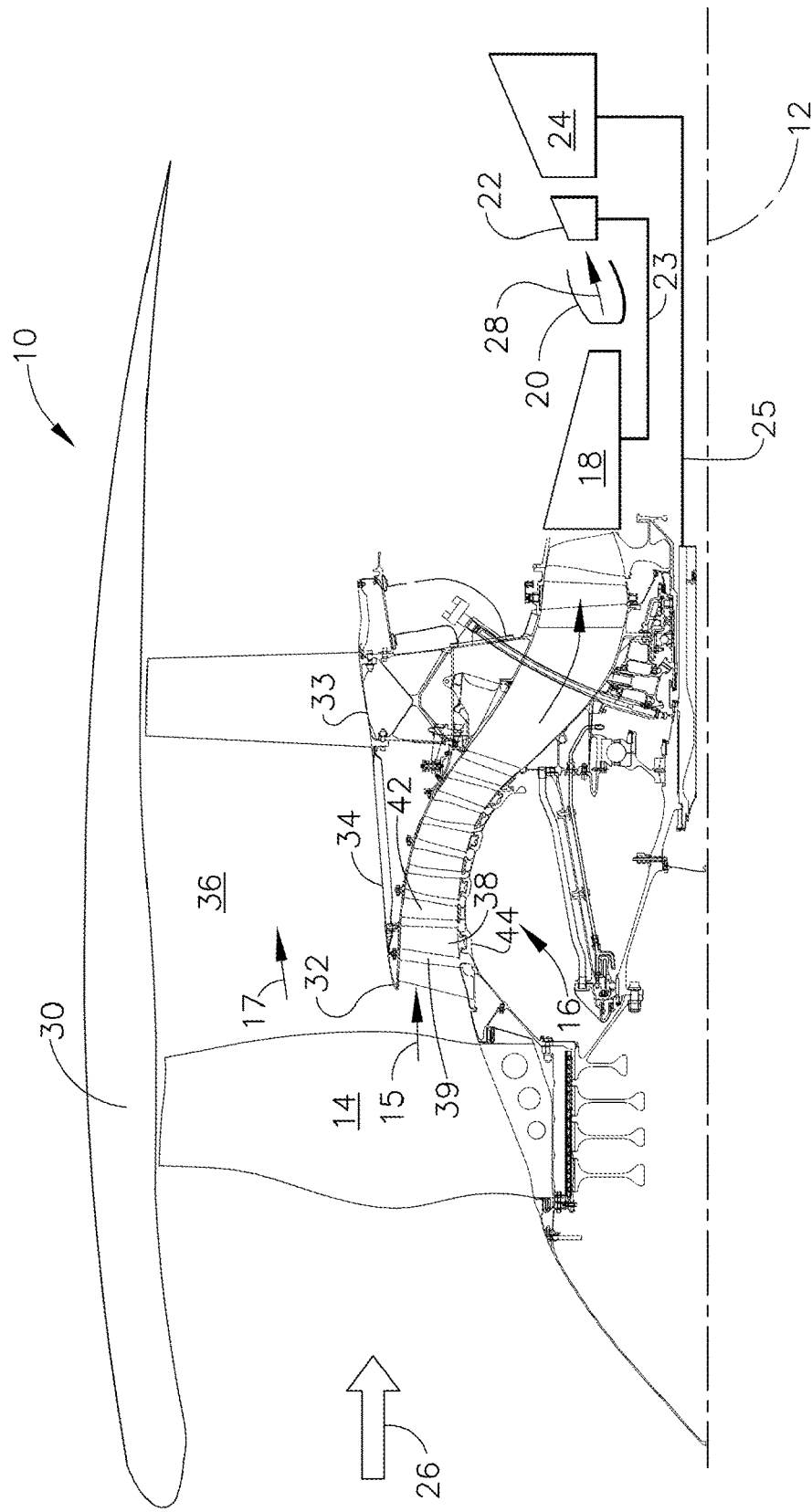
FIG. 1 is a longitudinal part sectional and part diagrammatical view of an example aircraft turbofan engine.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure includes, inter alia, gas turbine engines and, more particularly, compressor blades constructed of composite materials.

Metal booster blades with integral platforms may be mounted to the circumferential dovetails.

The present disclosure also contemplates that composite booster blades may be lighter than metal booster blades. Further, the present disclosure contemplates that it may be desirable to utilize composite booster blades on metal booster spools having circumferential dovetails typically used for metal booster blades. Accordingly, some example composite booster blades according to at least some aspects of the present disclosure may be configured for use with circumferential dovetails to allow implementation in both new and existing booster designs.

Further, the present disclosure contemplates that manufacturing a composite booster blade with an integral platform may present design and/or production challenges. Accordingly, some example embodiments according to at least some aspects of the present disclosure may relate to composite booster blades comprising separately manufactured airfoils and platforms.

Additionally, the present disclosure contemplates that, generally, by manufacturing airfoils and platforms separately, blades may be of a more simplistic design and/or may lend themselves more readily to constructions from fiber reinforced composite materials. Further, as some platforms may be subject to relatively light loads, they may be constructed from materials providing advantages other than high strength.

Generally, some example embodiments according to the present disclosure may include an airfoil and separate platforms or an airfoil with platform halves bonded or co-cured adjacent to each side of the airfoil. It should be appreciated that the term composite refers both to the fact that discrete components can be made up of a combination of materials or elements and a component can be made up of a combination of separate subcomponents which could each be made up of a single material or element which could be the same material or element for all subcomponents or a different material or element for different subcomponents and this material or element itself or these materials or elements themselves could be of a composite type made up of a combination of materials or elements.

FIG. 1 is a longitudinal part sectional and part diagrammatical view of an example aircraft turbofan engine 10, according to at least some aspects of the present disclosure. Engine 10 may be constructed about an axis of rotation 12, which may also be referred to as an engine centerline axis. Engine 10 may include, in downstream serial flow communication, a fan 14, a compressor booster 16, a high pressure compressor (HPC) 18, a combustor 20, a high pressure turbine (HPT) 22, and a low pressure turbine (LPT) 24. HPT 22 may be joined by a high pressure shaft 23 to HPC 18. LPT 24 may be joined by a low pressure shaft 25 to fan 14, compressor booser 16, or both (not shown for ease of illustration).

In typical operation, air 26 is pressurized by fan 14 and produces an inner air flow 15 channeled through compressor booster 16, which further pressurizes the inner air flow 15. The pressurized air flow 15 is then flowed to HPC 18, which further pressurizes the air flow 15. The pressurized air flow 15 is mixed with fuel in combustor 20, which generates hot combustion gases 28 that flow downstream in turn through HPT 22 and the LPT 24.

A flow splitter 34 surrounding the compressor booster 16 downstream of fan 14 may include a leading edge 32 configured to provide air 26 pressurized by fan 14 into inner air flow 15 and a radially outer bypass air flow 17 channeled through the bypass duct 36. A fan nacelle 30 surrounding fan 14 may be supported by an annular fan frame 33.

Compressor booster 16 may include alternating annular rows of composite booster blades 38 and vanes 42, which may extending radially outwardly and inwardly across a booster flowpath 39. Booster blades 38 may be suitably joined to rotate with fan 14, such as by being mounted to a booster spool 44.

Figure 2:
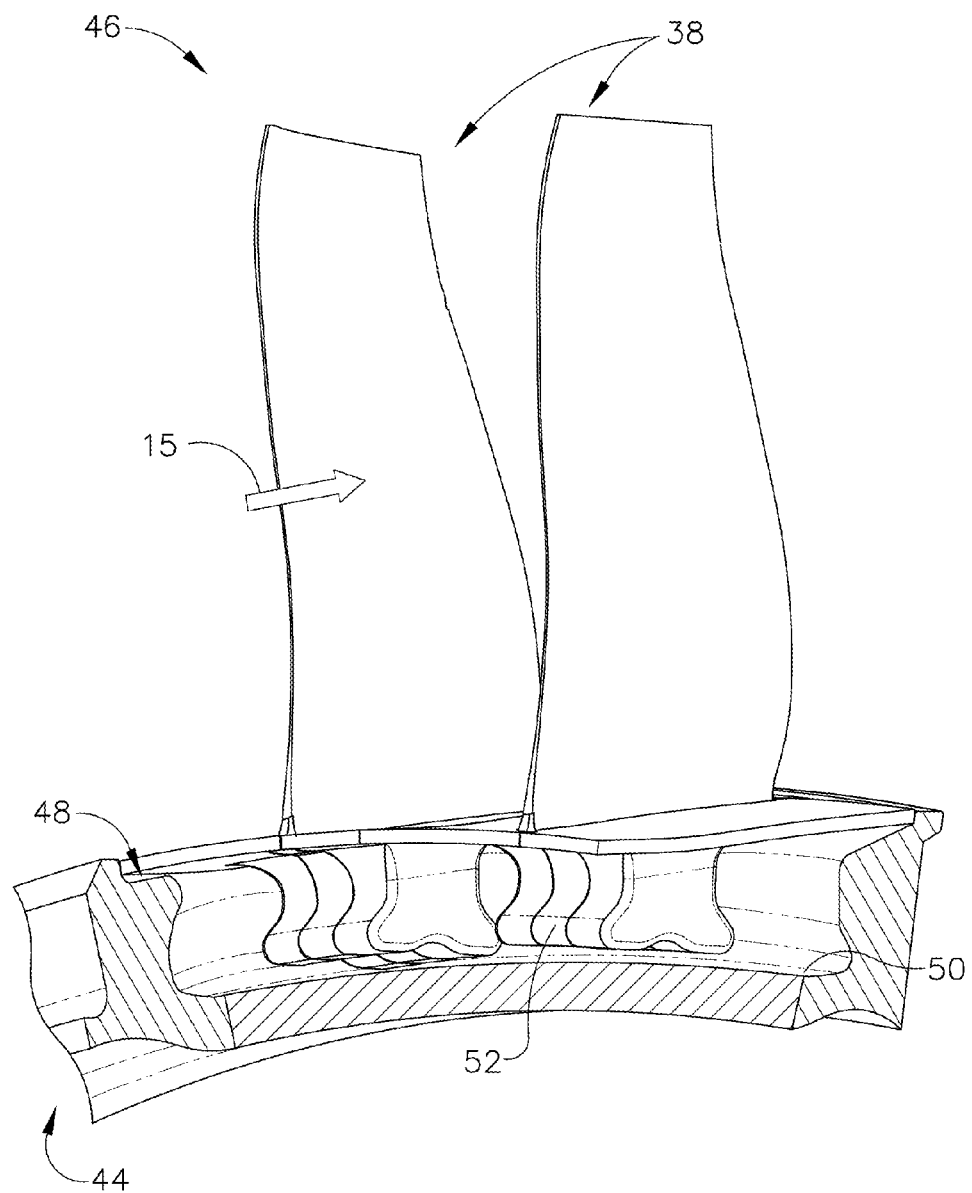
FIG. 2 is a detailed, partial cutaway view of an example compressor rotor.

FIG. 2 is a detailed, partial cutaway view of an example compressor rotor 46, according to at least some aspects of the present disclosure. Rotor 46 may comprise the booster spool 44, which may include a generally radially outward facing, circumferentially oriented spool attachment feature 48, such as, but not limited to, a circumferentially oriented dovetail slot 50. Individual blades 38 may be releasably mounted to spool 44 to extend radially outward, such as by engagement of a generally circumferentially oriented blade attachment feature 52 with spool attachment feature 48. For example, dovetail slot 50 may be configured to slidably receive blade attachment feature 52 therein.

Figure 3:
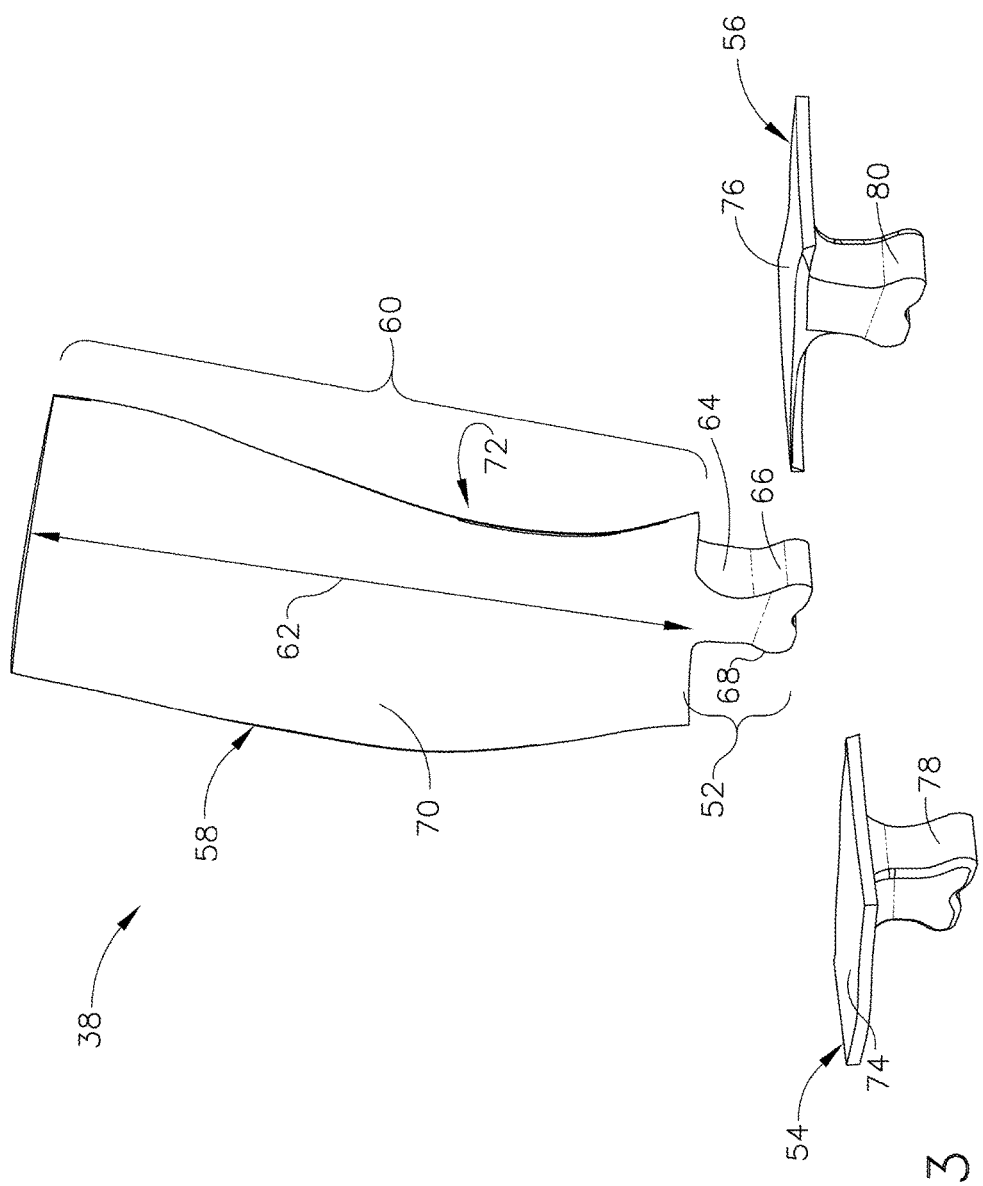
FIG. 3 is an exploded perspective view of an example composite compressor blade including bonded platforms.

FIG. 3 is an exploded perspective view of an example composite compressor blade 38 including bonded platforms 54, 56, according to at least some aspects of the present disclosure. Blade 38 may comprise a composite blade panel 58, which may include at least one of an airfoil 60 or blade attachment feature 52. Airfoil 60 may be arranged such that its span 62 extends generally radially outward with respect to the engine 10 axis of rotation 12 (FIG. 1). Airfoil 60 may include at least one of a pressure surface 70 or a suction surface 72. Blade attachment feature 52 may be disposed radially inward from airfoil 60 with respect to axis of rotation 12 or may be circumferentially oriented with respect to axis of rotation 12.

Blade attachment feature 52 may be generally shaped as a dovetail and may include at least one of a neck 64, a forward lobe 66, or an aft lobe 68. Forward lobe 66 or aft lobe 68 may be radially inward from neck 64 with respect to axis of rotation 12 (FIG. 1). Alternatively, both forward lobe 66 and aft lobe 68 may be radially inward from neck 64 with respect to axis of rotation 12. Blade attachment feature 52 may have a substantially uniform cross section in a circumferential direction with respect to axis of rotation 12.

Platform 54 may be disposed generally adjacent pressure surface 70 or platform 56 may be disposed generally adjacent suction surface 72. Alternatively, platform 54 may be disposed generally adjacent pressure surface 70 and platform 56 may be disposed generally adjacent suction surface 72. Platforms 54, 56 may extend generally circumferentially from blade panel 58 with respect to axis of rotation 12 (FIG. 1). Platforms 54, 56 may include radially outward facing flowpath surfaces 74, 76, respectively, each of which may be generally shaped as a segment of a cylinder. Platforms 54, 56 may include radially inwardly extending attachment features 78, 80, respectively, which may be configured to releasably engage spool attachment feature 48 (FIG. 2). Attachment features 78, 80 of platforms 54, 56 may be constructed to have substantially the same circumferential cross sections as blade attachment feature 52. In some example embodiments, means for attaching platforms 54, 56 to blade panel 58, may include, but not be limited to, welding, brazing, mechanically attaching, adhesively bonding, or co-curing.

Figure 4:
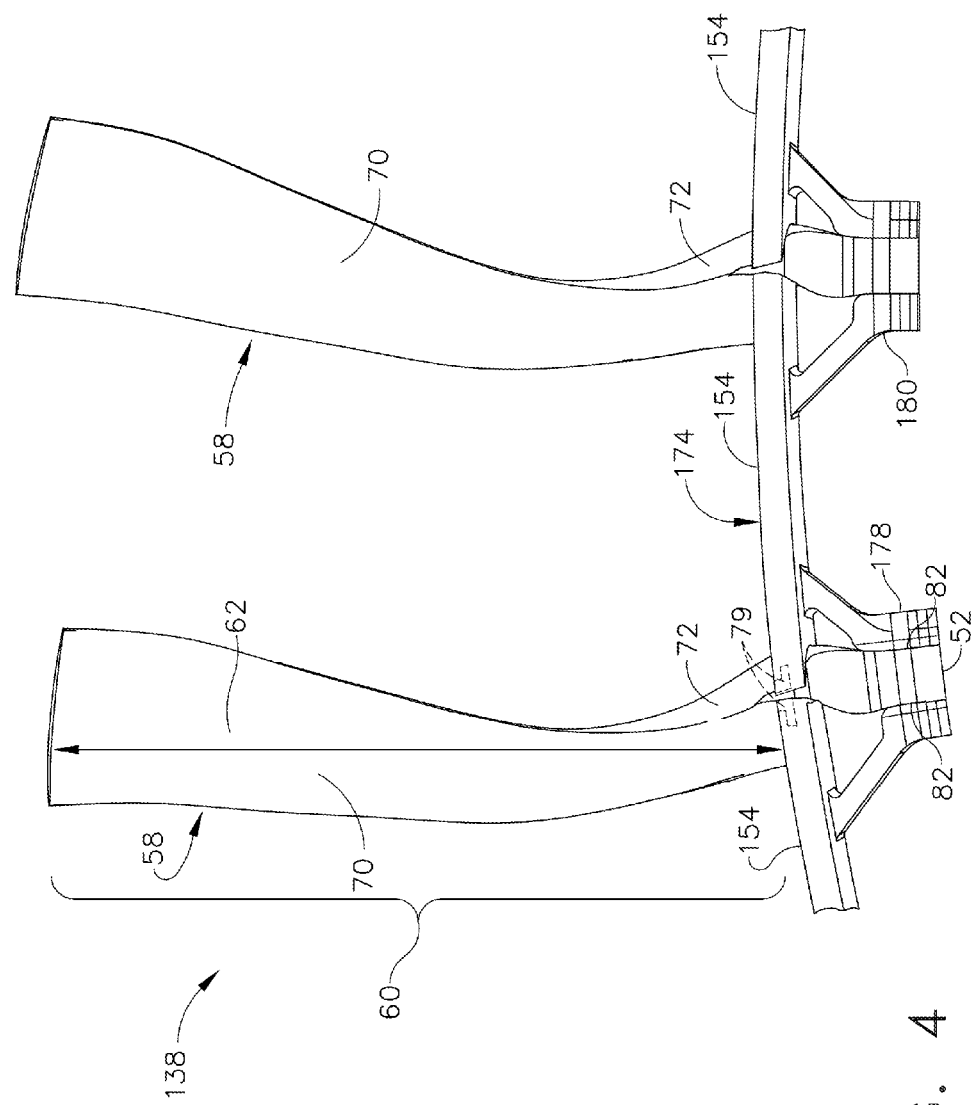
FIG. 4 is an axial view of an example composite compressor blade including separable platforms.

FIG. 4 is an axial view of an example composite compressor blade 138 including separable platforms 154, according to at least some aspects of the present disclosure. Blade 138 may include blade panel 58 (described above). An individual platform 154 may extend from adjacent suction surface 72 of one blade panel 58 to adjacent pressure surface 70 of an adjacent blade panel 58. An individual platform 154 may include a radially outward facing flowpath surface 174, which may be generally shaped as a segment of a cylinder. An individual platform 154 may include radially inwardly extending attachment features 178, 180, which may be associated with blade attachment features 52 of adjacent blade panels 58. Attachment features 178, 180 of platform 154 may be constructed to have substantially the same circumferential cross sections as blade attachment feature 52.

Some example embodiments may include one or more seals 79 arranged to limit leakage of inner flow air 15 (FIG. 1) radially inward between blade panels 58 and platforms 154. Some example seals 79 may be constructed of elastomeric, rubber-like materials. Some example embodiments may include one or more wear strips 82 between blade attachment feature 52 of blade panel 58 and attachment features 178, 180 of platform 154. Some example wear strips may be constructed of an aromatic polyamide, an aramid, or another material with similar properties such as heat resistance and strength. One such example is available under the brand Nomex®, a registered trademark of DuPont.

In some example embodiments, platforms 54, 56, 154 may be constructed of the same or different materials than blade panel 58. For example, blade panel 58 may be constructed of fiber reinforced polymeric matrix composite (e.g., continuous fiber and/or chopped fiber). Some example blade panels 58 may be manufactured using resin transfer molding injection methods or pre-preg layup/autoclave cure methods. Some example lay ups may include uni-directional composites, biax or woven composites, quasi-isotropic composites, and/or chopped fiber composites. Some example fibers may be made of carbon or glass fiber variants. Some example resin systems include epoxy, thermoplastic, or vinyl ester. Generally, in some example embodiments, blade panels 58 may be constructed from non-metallic (or substantially non-metallic) materials.

Some example platforms 54, 56, 154 may be constructed of cast-able/mold-able fiber reinforced composite and/or thermoplastic (e.g., injection molded). Example fibers include variants of carbon and/or glass fiber in chopped formats. Example resin material systems include epoxies, vinyl esters, and/or similar systems. Example thermoplastics include polymer variants such as PEEK (poly(ether ether ketone)), PEKK (poly(ether ketone ketone)), PEI (poly (ether imide)), PPS (polyphenylene sulfide), Nylon (polyamide), PC (polycarbonate) and/or similar systems. Some example embodiments may include thermoplastics with filling materials. Some example platforms 54, 56, 154 may include vibration limiting features, such as underside complex ribs for frequency tuning. In some example embodiments, platforms 54, 56, 154 may be constructed from non-metallic (or substantially non-metallic) materials.

Figure 5:
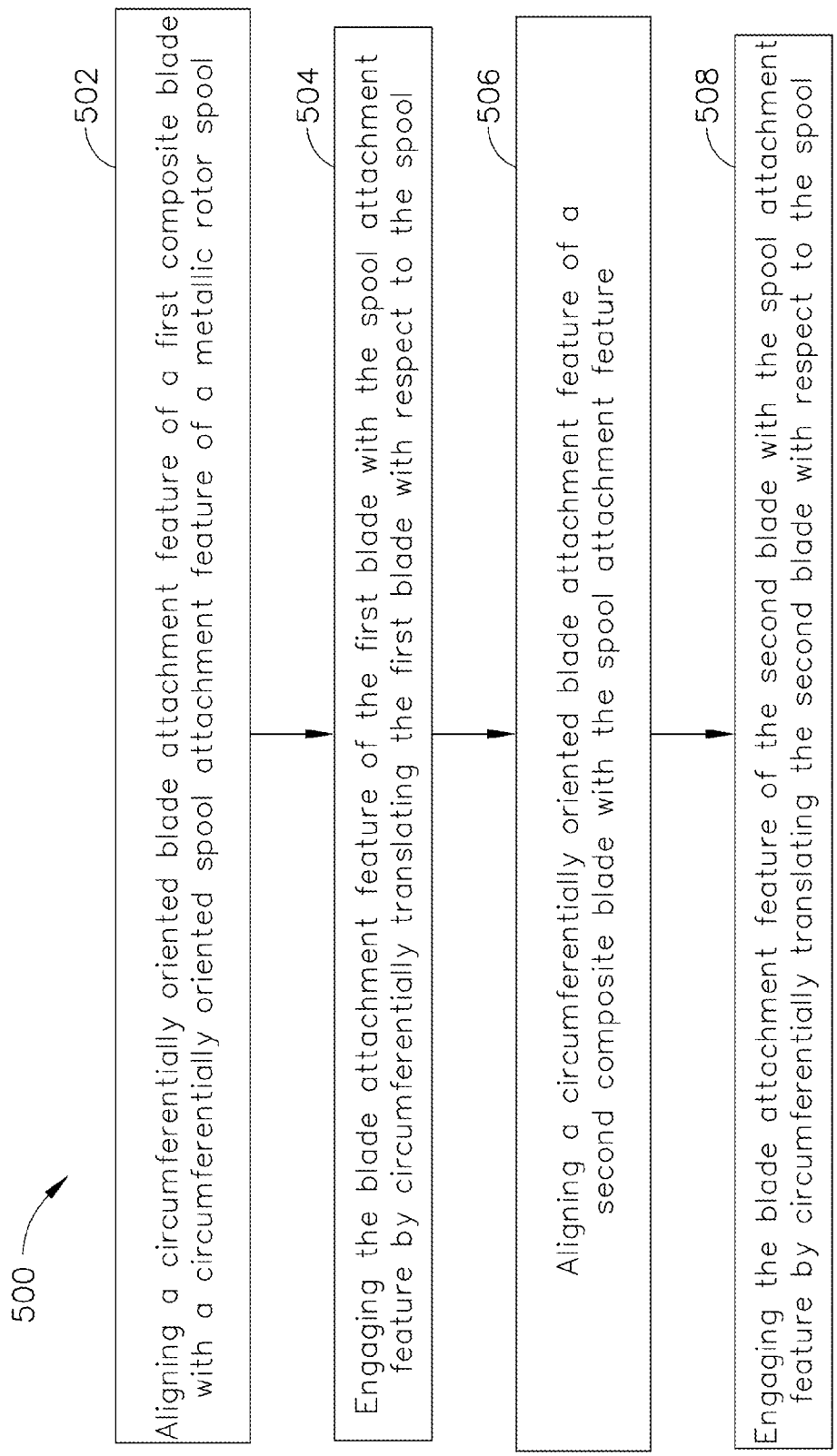
FIG. 5 is a flowchart illustrating an example method of assembling a compressor rotor spool, all in accordance with at least some aspects of the present disclosure.

FIG. 5 is a flowchart illustrating an example method 500 of assembling a compressor rotor 46, according to at least some aspects of the present disclosure. Method 500 may include an operation 502, which may include aligning a circumferentially oriented blade attachment feature 52 of a first composite blade 38, 138 with a circumferentially oriented spool attachment feature 48 of a metallic rotor spool 44. Operation 502 is followed by an operation 504, which may include engaging the blade attachment feature 52 of the first blade 38, 138 with the spool attachment feature 48 by circumferentially translating the first blade 38, 138 with respect to the spool 44. Operation 504 is followed by an operation 506, which may include aligning a circumferentially oriented blade attachment feature 52 of a second composite blade 38, 138 with the spool attachment feature 48. Operation 506 is followed by an operation 508, which may include engaging the blade attachment feature 52 of the second blade 38, 138 with the spool attachment feature 48 by circumferentially translating the second blade 38, 138 with respect to the spool 44. An example method includes installing the rotor spool 44 on a shaft 25.

Some example methods of assembling a compressor rotor 46 may include, after engaging the blade attachment feature 52 of the second blade 38 with the spool attachment feature, circumferentially translating the second blade 38 with respect to the spool 44 until a platform 54, 56 extending circumferentially from the second blade abuts a platform 54, 56 extending circumferentially from the first blade 38.

Another example method of assembling a compressor rotor 46 may include, before engaging the blade attachment feature 52 of the second blade 138 with the spool attachment feature 48, aligning a circumferentially oriented attachment feature 178, 180 of a platform 154 with the spool attachment feature 48 and/or engaging the attachment feature 178, 180 of the platform 154 with the spool attachment feature 48 by circumferentially translating the platform 154 with respect to the spool 44.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A compressor blade, comprising:
    a composite blade panel comprising;
        an airfoil having a span extending radially outward with respect to an axis of rotation,
        a blade attachment feature radially inward from said airfoil with respect to said axis of rotation, said blade attachment feature being circumferentially oriented with respect to said axis of rotation;
        a first platform comprising a radially outward facing flowpath surface generally shaped as a segment of a cylinder, and further comprising a first platform attachment feature disposed adjacent to a first side corresponding to the suction side of the blade attachment feature of the blade panel; and
        a second platform comprising a radially outward facing flowpath surface generally shaped as a segment of a cylinder, and further comprising a second platform attachment feature disposed adjacent to a second side corresponding to the pressure side of the blade attachment feature of the blade panel; and
    a wear strip disposed between the blade attachment feature of the blade panel and each of the first platform attachment feature of the first platform and the second platform attachment feature of the second platform.

2. The compressor blade of claim 1, wherein said blade attachment feature is arranged to releasably engage a generally circumferentially oriented spool attachment feature.

3. The compressor blade of claim 2, wherein said spool attachment feature is generally shaped as a circumferential dovetail slot configured to slidably receive said blade attachment feature therein.

4. The compressor blade of claim 1, wherein said blade attachment feature is generally shaped as a dovetail and comprises a neck, a forward lobe, and an aft lobe, said forward lobe and said aft lobe being radially inward from said neck with respect to said axis of rotation, said blade attachment feature having a substantially uniform cross section in a circumferential direction with respect to said axis of rotation.

5. The compressor blade of claim 1, wherein the wear strip comprises an aromatic polyamide or an aramid.

6. The compressor blade of claim 1, wherein said first platform is constructed of a thermoplastic.

7. The compressor blade of claim 1, wherein said first platform is one of adhesively bonded or co-cured to said blade panel.

8. The compressor blade of claim 1, wherein said blade panel is constructed from at least one of continuous fibers and chopped fibers.

9. A compressor rotor comprising:
    a metallic rotor spool arranged to rotate about an axis of rotation, said rotor spool comprising a generally radially outward facing, circumferentially oriented spool attachment feature;

a plurality of composite blades releasably mounted to said rotor spool to extend radially outward from said rotor spool, wherein each blade comprises:
an airfoil having a span extending radially outward with respect to said axis of rotation, and
a circumferentially oriented blade attachment feature radially inward from said airfoil with respect to said axis of rotation, said blade attachment feature releasably engaging said spool attachment feature; and
a first platform comprising a radially outward facing flowpath surface generally shaped as a segment of a cylinder, and further comprising a first platform attachment feature disposed adjacent to a first side corresponding to the suction side of the blade attachment feature of the blade; and
a second platform comprising a radially outward facing flowpath surface generally shaped as a segment of a cylinder, and further comprising a second platform attachment feature disposed adjacent to a second side of the blade attachment feature of the blade corresponding to the pressure side of the blade; and
a first wear strip disposed between the first platform attachment feature of the first platform and the blade attachment feature of the blade panel, and a second wear strip between the second platform attachment feature of the second platform and the blade attachment feature of the blade.

10. The compressor rotor of claim 9, further comprising a plurality of platforms disposed between said plurality of blades, said platforms providing a generally cylindrical, radially outward facing flowpath surface radially outward from said spool attachment feature.

11. The compressor rotor of claim 9, wherein said individual one of said blades is associated with a first one of said platforms disposed adjacent a suction surface of said individual blade, said first platform extending generally circumferentially from said individual blade, said first platform comprising a radially outward facing flowpath surface generally shaped as a segment of a cylinder; and
wherein said individual blade is associated with a second platform disposed adjacent a pressure surface of said individual blade.

12. The compressor rotor of claim 11, wherein said first platform and said second platform are adhesively bonded to said individual blade.

13. The compressor rotor of claim 9, wherein an individual one of said platforms is circumferentially slidably engaged with said spool attachment feature.

14. A method of assembling a compressor rotor comprising:
aligning a blade attachment feature of a first composite blade between a first platform attachment feature of a first platform, a second platform attachment feature of a second platform, and a wear strip between the blade attachment feature and each platform attachment feature;
aligning the circumferentially oriented blade attachment feature of the first composite blade with a circumferentially oriented spool attachment feature of a metallic rotor spool;
engaging said blade attachment feature of said first blade with said spool attachment feature by circumferentially translating said first blade with respect to said spool;
aligning a circumferentially oriented blade attachment feature of a second composite blade with said spool attachment feature; and
engaging said blade attachment feature of said second blade with said spool attachment feature by circumferentially translating said second blade with respect to said spool.

15. The method of claim 14, further comprising, after engaging said blade attachment feature of said second blade with said spool attachment feature, circumferentially translating said second blade with respect to said spool until a platform extending circumferentially from said second blade abuts a platform extending circumferentially from said first blade.

16. The method of claim 14, further comprising, before engaging said blade attachment feature of said second blade with said spool attachment feature, aligning a circumferentially oriented blade attachment feature of a platform with said spool attachment feature; and engaging said blade attachment feature of said platform with said spool attachment feature by circumferentially translating said platform with respect to said spool.

17. The method of claim 14, further comprising installing said rotor spool on a rotor shaft.

\* \* \* \* \*